United States Patent
Parimi et al.

(10) Patent No.: US 8,818,858 B1
(45) Date of Patent: Aug. 26, 2014

(54) ENSURING APPEARANCE OF MERCHANT OFFERING IN NETWORK SITES

(75) Inventors: Nagender Parimi, Seattle, WA (US); Jeetendra G. Mirchandani, Bellevue, WA (US); Desai Nishitkumar Ashokkumar, Seattle, WA (US); Mohit Gupta, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 416 days.

(21) Appl. No.: 12/644,299

(22) Filed: Dec. 22, 2009

(51) Int. Cl.
*G06Q 30/00* (2012.01)

(52) U.S. Cl.
USPC ............... 705/14.55; 705/26.9; 705/27.1

(58) Field of Classification Search
USPC ........................................... 705/14
See application file for complete search history.

(56) References Cited

U.S. PATENT DOCUMENTS

| | | | |
|---|---|---|---|
| 2002/0107861 A1* | 8/2002 | Clendinning et al. | 707/101 |
| 2005/0289158 A1* | 12/2005 | Weiss et al. | 707/100 |
| 2008/0091667 A1* | 4/2008 | Nair | 707/4 |
| 2008/0127097 A1* | 5/2008 | Zhao et al. | 717/124 |
| 2011/0072002 A1* | 3/2011 | Kirkby et al. | 707/711 |

\* cited by examiner

*Primary Examiner* — John G Weiss
*Assistant Examiner* — Eric Netzloff
(74) *Attorney, Agent, or Firm* — Thomas | Horstemeyer, LLP

(57) ABSTRACT

The present disclosure involves ensuring that items sold by a merchant appear in certain network pages. A network page is automatically accessed in a computing device. The network page is generated by a referral network site that displays at least one offering of an item by at least one competitor merchant. A unique identifier associated with the item is identified from the network page in the computing device. The unique identifier is stored in association with the item in a data store accessible to the computing device. The item and the unique identifier are included in a feed sent from the computing device of a merchant to the referral network site. The feed includes a listing of the item and a plurality of other items, wherein the item and the other items are offered for sale by the merchant.

27 Claims, 4 Drawing Sheets

ENSURING APPEARANCE OF MERCHANT OFFERING IN NETWORK SITES

BACKGROUND

For merchants that sell products on the Internet, it can be useful to have other network sites help drive traffic to the network site of the merchant in order to increase sales. Such other network sites may be paid a referral fee or other fee by the merchant for each customer that is directed to the network site of the merchant. Such other network sites may comprise comparison shopping sites that compare the prices of multiple merchants for various items.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
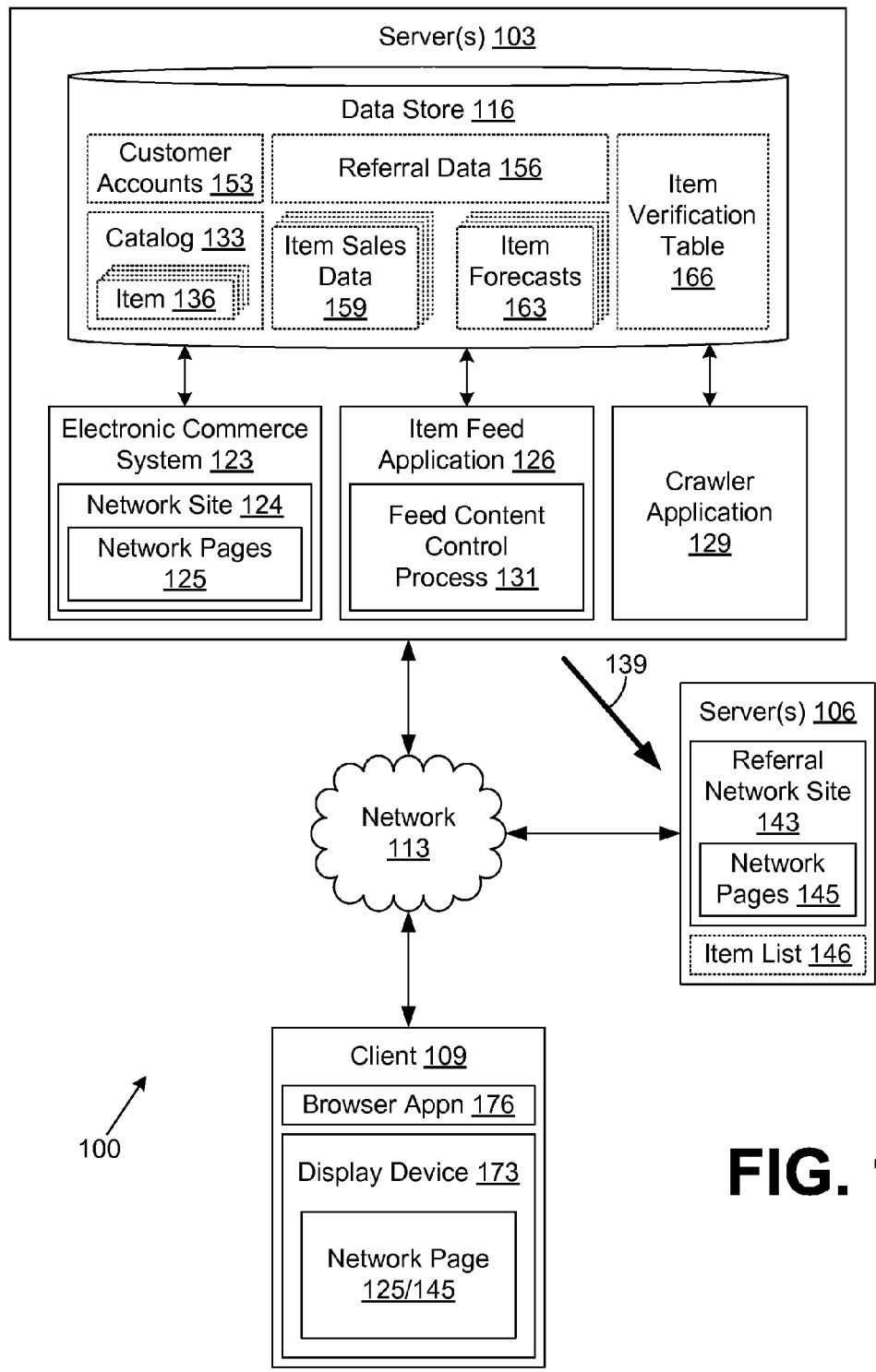
FIG. 1 is a drawing of a networked environment that includes servers and a client according to an embodiment of the present disclosure.

With reference to FIG. 1, the following relates to the verification that an offering of a merchant appears in network pages from a network site such as a comparison shopping site in a networked environment 100 in association with the activities of a merchant that sells goods and/or services online over a network such as the Internet or other network. In the following discussion, first a description of the physical nature of the networked environment 100 is provided, followed by a description of the operation of the same. A more detailed discussion of various aspects is provided with respect to later figures.

The networked environment 100 depicted in FIG. 1 includes various computing devices such as, for example, one or more servers 103, one or more servers 106, one or more clients 109, and/or other computing devices that are coupled to a network 113. The network 113 may comprise, for example, the Internet, intranets, extranets, wide area networks (WANs), local area networks (LANs), wired networks, wireless networks, or other suitable networks, etc., or any combination of two or more such networks. For purposes of convenience, each of the servers 103, 106 and the client 109 are referred to herein in the singular. However, it is understood that in one embodiment, each of the servers 103, 106 may represent a plurality of servers. Also, the client 109 may represent a plurality of clients.

Each of the servers 103 and/or 106 comprises one example of a computing device that may be employed to execute various components as described herein. Each of the servers 103 and/or 106 may comprise, for example, a server computer or like system, and may represent multiple servers arranged, for example, in one or more server banks or other arrangements. Such servers may be located in a single installation or may be dispersed among many different geographical locations. To this end, each of the servers 103 and/or 106 may be viewed as a server "cloud" that represents the computing capacity of multiple servers, etc.

Various applications and/or engines are executed in the server 103 according to various embodiments. Also, various data may be stored in a data store 116 that is accessible to the server 103. The data stored in the data store 116, for example, may be associated with the operation of the various systems, applications, and/or processes described below. The systems and applications executed in the server 103 may include, for example, an electronic commerce system 123, an item feed application 126, a crawler application 129, and potentially other systems and applications. Among other functions, the electronic commerce system 123 includes a network site 124 as will be described. The item feed application 126 includes a feed content control process 131 as will be described. In addition, other systems, applications, and/or processes may be implemented in the server 103 that are not discussed in detail herein.

The electronic commerce system 123 is configured to conduct electronic commerce to facilitate the network presence of one or more online merchants through the network site 125. Thus, the electronic commerce system 123 operates one or more network sites 124 such as web sites on the Internet that facilitate electronic commerce. The electronic commerce system 123 may comprise many different applications, components, and/or systems implemented on a plurality of computing devices such as the server 103 that are located at one site, or are distributed among geographically diverse sites as can be appreciated.

The applications and/or components that make up the electronic commerce system 123 provide for various functions to facilitate electronic commerce such as maintaining and accessing a catalog 133 in which is stored data describing a plurality of items 136 such as products sold to customers by an online merchant. The data describing each of the items 136 may include item images and other information. The items 136 sold through the electronic commerce system 123 may comprise, for example, goods and/or services.

The electronic commerce system 123 may also facilitate various functions associated with the operation of the network site 124 such as, for example, generating network pages 125 that provide for searching for items 136 and presenting search results for such items 136. Such network pages 125 may also present detailed information about items 136 and may facilitate the purchase of items 136 by providing for payment for items 136 and facilitating other functions. Thus, in providing for the purchase of items 136, the electronic commerce system 123 implements one or more network sites 124 that generate a plurality of different network pages 125 such as web pages or other network content that is served up to various clients 109 controlled by customers. Such network pages 125 may be static and/or created dynamically.

The item feed application 126 is executed in the server 103 in order to generate a feed 139 that comprises a listing of the items 136 that is sent to a referral network site 143 implemented on the server 106. The referral network site 143 functions to refer clients 109 to the network site 124 and other sites as will be described. The referral network site 143 generates and serves up network pages 145 to clients 109 as will be described.

The information included in the feed 139 is stored in association with the operation of the referral network site 143 as item list 146. The crawler application 129 is executed in the server 103 in order to ensure that the referral network site 143 takes proper action with respect to the items 136 listed in the feed 139 after it is received at the referral network site 143.

In addition, various customer accounts 153 may be maintained in the data store 116. Such customer accounts 153 may include customer data that describes the customer including payment addresses, delivery addresses, payment instruments, and other data used to consummate various commercial transactions. Also associated with each of the customer accounts 153 are browse histories, purchase histories, and potentially other data.

Also stored in the data store 116 are referral data 156, item sales data 159, item forecast data 163, an item verification table 166, and potentially other data. The referral data 156 includes data that tracks when a client 109 has requested a network page 125 from the network site 124 based upon a referral from the referral network site 143 as will be described. The item sales data 159 tracks the number of each of the items 136 that are sold over time through the electronic commerce system 123 as well as other information about the sales of items 136. The item forecast data 163 includes sales forecasts generated for each of the items 136 that are generated based on various factors such as past sales performance and other factors. The item verification table 166 is used to track whether items 136 included in the feed 139 appear on respective network pages 145 generated by the referral network site 143 as expected. The various data stored in the data store 116 may be stored or accessed by the electronic commerce system 123, the item feed application 126, the crawler application 129, or other applications and systems as can be appreciated.

As mentioned above, the server 106 is employed to implement the referral network site 143. In one embodiment, the referral network site 143 provides for comparison shopping and is configured to generate and serve up network pages 145 that include listings of multiple offerings for various items 136 from multiple different merchants as will be described. The item list 146 includes information about each of the items 136 included in the feed 139 sent to the referral network site 143. Such information may include all or a portion of the information contained about such items 136 in the catalog 133.

The client 109 is representative of a plurality of client devices that may be coupled to the network 113. For example, the client 109 may comprise one of millions of clients 109 coupled to the Internet. The client 109 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 109 may include, for example various peripheral devices. In particular, the peripheral devices may include input devices such as, for example, a keyboard, keypad, touch pad, touch screen, microphone, scanner, mouse, joystick, or one or more push buttons, etc. The peripheral devices may also include a display device 173, indicator lights, speakers, etc. The display device 173 may comprise, for example, cathode ray tubes (CRTs), liquid crystal display (LCD) screens, gas plasma-based flat panel displays, LCD projectors, or other types of display devices, etc.

Executed within the client 109 are various applications including a browser application 176. The client browser application 176 is configured to interact with the electronic commerce system 123 and potentially other applications on the server 103 according to an appropriate protocol such as the Internet Protocol Suite comprising Transmission Control Protocol/Internet Protocol (TCP/IP) or other protocols. To this end, the browser application 176 may comprise, for example, a commercially available browser such as INTERNET EXPLORER® sold by Microsoft Corporation of Redmond, Wash., or MOZILLA FIREFOX® which is promulgated by Mozilla Corporation of Mountain View, Calif., or other type of browser. Alternatively, the browser application 176 may comprise some other type of interface application with like capability. When executed in the client 109, the browser application 176 is configured to render network pages 125/145 such as, for example, web pages and the like on the display device 173 and to perform other functions. Also, the browser application 176 may implement the execution of active portions of the network pages 125/145 as can be appreciated.

Next, a general description of the operation of the various components described above in the networked environment 100 is provided. The electronic commerce system 123 is configured to conduct electronic commerce with various customers through clients 109 over the network 113 as described above. To this end, the electronic commerce system 123 implements a network site 124 through which items 136 are sold to customers as can be appreciated. Such items 136 are stored in the catalog 133 as described above. In conducting electronic commerce with various clients 109, the electronic commerce system 123 may serve up various network pages 125 that serve various purposes as mentioned above.

The sales of items 136 through the electronic commerce system 123 may occur through any one of multiple channels. One such channel involves sales that originate through a referral from a respective referral network site 143. Another channel involves direct sales consummated by the electronic commerce system 123 without a referral. In addition, sales of items 136 may involve other channels. Thus, a channel as contemplated herein refers to a mode in which the sale of an item 136 was originated or consummated.

As mentioned above, in one embodiment, the referral network site 143 implemented on the server 106 refers customers to the network site 124 associated with the electronic commerce system 123 to potentially consummate a purchase of an item 136.

Figure 2:
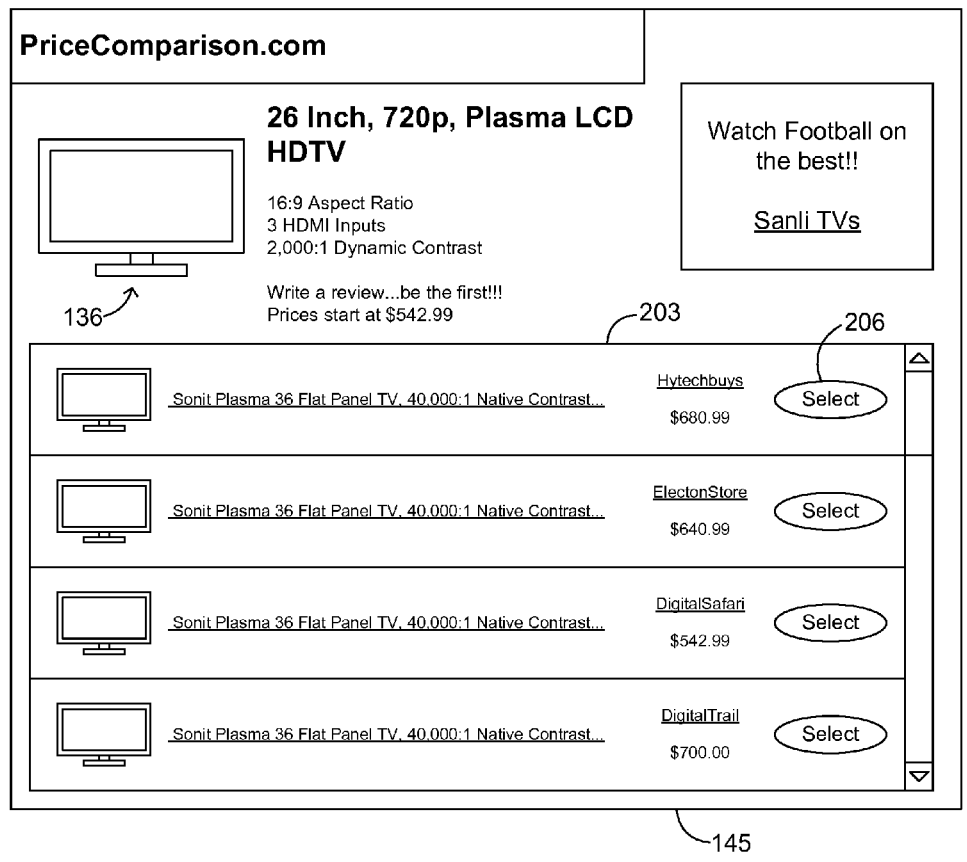
FIG. 2 is a drawing of a network page generated by a network site hosted on one of the servers in the networked environment of FIG. 1 according to an embodiment of the present disclosure.

To explain further, reference is made to FIG. 2, in which one example is shown of a network page 145 generated by the referral network site 143 (FIG. 1). The network page 145 is one example of many different network pages 145 generated by the referral network site 143, where the referral network site 143 provides for price comparison shopping. Examples of such price comparison sites include www.shopzilla.com, www.shopping.com, and other such sites. To this end, the network page 145 displays an item 136 along with a basic description of the item 136. A more detailed description of the item 136 may also be displayed, or links, tabs, or other connections to a more detailed explanation may be included, etc. In addition, the network page 145 displays a number of merchant offerings 203 for the respective item 136 by competitor merchants. To this end, a user is able to specify a given item 136 that they wish to purchase on the referral network site 143 by performing a product search or by navigating through a taxonomy as can be appreciated. The user may then cause the referral network site 143 to generate the network page 145 that sets forth the merchant offerings 203 for the respective item 136. The user can then compare the various merchant offerings 203 for the item 136 and select the offer they favor the most. Associated with each merchant offering 203 is a link 206 that directs the customer to a respective site of a corresponding merchant. One of the links 206 directs the customer to the network site 124 (FIG. 1) of the merchant that operates the electronic commerce system 123 (FIG. 1) described above. Each of the links 206 may be embodied in the form of a "select" button or other component as can be appreciated. If a user wishes to pursue a purchase of the item 136 based on a respective merchant offering 203, then the user may click on the respective button or other component associated with such merchant offering 203 to be referred to the merchant site.

Referring back to FIG. 1, upon manipulating the link 206, the user is referred to a network page 125 (FIG. 1) generated by the network site 124 that comprises, for example, a detail page presenting the item 136 with the ability to place such item into a shopping cart and proceed to checkout in order to purchase such item 136 or take other action. In order to cause the network site 124 to generate the respective network page 125 that comprises a detail page presenting the respective item 136 viewed in the network page 145, the link 206 causes a browser application 176 (FIG. 1) to generate a request for the specific network page 125 that comprises the detail page presenting the item 136 as can be appreciated.

Such a request includes information indicating that the request is based upon a referral from the respective referral network site 143. The electronic commerce system 123 is configured to store all of the referrals received from referral network sites 143 for each of the items 136 in the referral data 156 (FIG. 1). Thus, over time, the electronic commerce system 123 will store all of the referrals received from referral network sites 143 in the data store 116 (FIG. 1) for future reference in determining whether items 136 are to be included in the feed 139 (FIG. 1) as will be described.

In some situations, there may be a commercial relationship established between the operator of a referral network site 143 and a merchant who operates the electronic commerce system 123. For example, the merchant operating the electronic commerce system 123 may pay the operator of a referral network site 143 a predefined fee for each referral received. Alternatively, the merchant and the operator of the referral network site 143 may agree that the merchant is to pay the operator a predefined percentage of the sales price for all items 136 sold based upon a referral received from the referral network site 143.

In this respect, the parties may generate mutually beneficial relationships such that the merchant receives the benefit of extra traffic driven to the network site 124, and the operator of the referral network site 143 receives the benefit of having more items 136 to list and more merchant offerings 203 (FIG. 2) to show in various comparisons for various items 136 as described above. In addition, there may be other terms specified between the parties for the referral activity.

A number of referrals may be tracked in both the server 103 (FIG. 1) by the respective merchant and in the server 106 (FIG. 1) by the respective operator of the referral network site 143 so that precise amounts owed based upon referrals as described above can be determined. Similarly, the number of sales based upon a referral may be maintained in the server 103 in the item sales data 159 (FIG. 1) so that appropriate amounts may be calculated to pay to the operator of the referral network site 143 as can be appreciated.

In order to provide the operator of the referral network site 143 with the information needed to present the merchant offering 203 with respect to items 136, the item feed application 126 (FIG. 1) is executed in the server 103 in order to generate the feed 139 that includes a subset of the total number of items 136 stored in the catalog 133. The feed 139 includes a listing of a subset of all of the items 136 contained in the catalog 133 that have been selected or otherwise designated to send to the referral network site 143. The information contained in the feed 139 for each of the items 136 included therein may comprise selected details about such items 136 including item images, item descriptions, item feedback ratings, and other information as can be appreciated.

The feed 139 may be sent from the item feed application 126 to the referral network site 143 periodically in such a manner so as to maintain the most up-to-date item list 146 (FIG. 1) in the referral network site 143. For example, the feed 139 may be sent weekly, daily, every few hours, or any other appropriate time interval as can be appreciated. In one embodiment, the feed 139 may include a description of all items 136 included therein in a complete listing. In other embodiments, the feed 139 may only include such information that has changed relative to a prior feed 139 sent previously. For example, such information may include any changed prices, or other aspects of the items 136 that have been sent to the referral network site 143 in a prior feed 139.

The feed content control process 131 is executed as a portion of the item feed application 126 in order to determine whether items 136 are to be included in the feed 139. Also, from time to time, the feed content control process 131 (FIG. 1) determines whether items 136 that have been previously excluded from the feed 139 should be reintroduced or re-included. To this end, the feed content control process 131 may be configured to determine whether to reintroduce or re-include one or more of the items 136 that were previously excluded. Such a determination may be made upon an occurrence of at least one circumstance that renders obsolete a prior determination of exclusion of the one or more items 136 from the feed 139.

Such a circumstance may comprise an event or a pending event in the future that would cause a change in consumer habits with respect to purchases of a given item 136. For example, in the holiday shopping season in the fall, it may be that items 136 are sold at a more rapid pace, where more of such items 136 will want to be included into the feed 139. In addition, other holidays may occur where sales for various items 136 tend to increase during such periods of time. Such circumstances may render obsolete a prior determination that a given item 136 should be excluded from the feed 139 due to the lack of sales or other reason as will be described.

When the referral network site 143 receives the feed 139, the items 136 included in the feed 139 are saved in the server 106 in the item list 146. When generating the network pages 145 to list various merchant offerings 203 for a given item 136, the referral network site 143 may unwittingly exclude the merchant offering 203 from the merchant operating the electronic commerce system 123 from among those listed. This may be due to some problem such as, for example, the fact that the referral network site 143 may have difficulty identifying that a search request by a given customer to view certain items 136 actually reads on the respective item 136 that was not displayed.

In addition, the referral network site 143 may employ an identification system that uses identifiers similar to stock-keeping units (SKU) or universal product codes (UPC) to identify items 136. Such identifiers may or may not be globally unique identifiers. In some cases, it may be that item identifiers associated with each item 136 by the referral network site 143 may differ from item identifiers used in association with the operation of the electronic commerce system 123. It may also be the case that the network site 124 operated by the electronic commerce system 123 uses a taxonomy that specifies categories of items 136 that differ from a taxonomy used by the referral network site 143, thereby causing mismatches between respective groups or categories of items 136.

According to one embodiment, the merchant manually accesses network pages 145 for respective items 136 to determine whether the merchant offerings 203 for respective items 136 included in the feed 139 actually appear in respective network pages 145 generated by the referral network site 143. A browser application on a client 109 (FIG. 1) may be employed by the merchant that includes a button or other component that may be manipulated if the merchant determines that the merchant offering 203 set forth in the feed 139 does not appear. Upon manipulating such a component, the browser sends a message to respective functions in either the electronic commerce system 123 or the crawler application 129 (FIG. 1) that includes the network address such as a uniform resource locator (URL) or other address information of the network page 145 in which the respective item 136 offered by the merchant did not appear. Such network address is then stored in the data store 116 (FIG. 1) for further scrutiny as will be described.

At a later time, the network address is used to access the respective network page 145. A unique identifier associated with the item 136 that is known to the referral network site 143 is identified in the network address or in the network page 145. Once known, the unique identifier is included in the feed 139 in association with the respective item 136 in the hope that the referral network site 143 will recognize the unique identifier, thereby allowing the referral network site 143 to correlate the merchant offering 203 for the item 136 with the item 136 requested by a user searching for such an item 136 on the referral network site 143. Thus, including the unique identifier for an item 136 known to the referral network site 143 in the feed 139 should make it easier for the referral network site 143 to know when it should include the merchant offering 203 for the item 136 in a respective network page 145.

Figure 3:
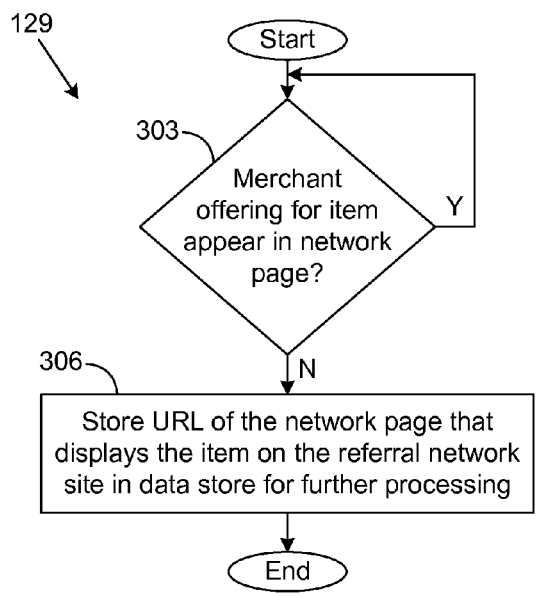
FIG. 3 is a drawing of a flowchart that illustrates example functionality of a crawler application implemented in one of the servers in the networked environment of FIG. 1 according to an embodiment of the present disclosure.

With reference to FIG. 3, shown is a flowchart that illustrates functionality of the crawler application 129 according to various embodiments. Alternatively, the same functionality may be included as part of the electronic commerce system 123 (FIG. 1). As a further alternative, the flowchart of FIG. 3 may be viewed as depicting steps of a method implemented in the server 103 (FIG. 1) according to various embodiments.

To begin, in box 303 it is determined whether a message has been received from a respective browser or other application indicating that the merchant offering 203 (FIG. 2) associated with a given item 136 (FIG. 1) is not present in a network page 145 (FIG. 1) where it should be listed. In such case, the item 136 is presumably listed in the feed 139 (FIG. 1) sent to the referral network site 143 (FIG. 1). If the item 136 is not present, then the crawler application 129 proceeds to box 306 in which the network address associated with the network page 145 that displays the respective item 136 on the referral network site 143 is stored in the data store 116 (FIG. 1) for further processing. In one embodiment, the network address is saved in the item verification table 166 (FIG. 1) in association with the respective item 136. Thereafter, the functionality of this portion of the crawler application 129 ends as shown.

Thus, the crawler application 129 is configured to automatically store the network address of the respective network page 145 that is accessed and rendered by a given browser or other application on a client 109 (FIG. 1) in the data store 116 in response to a user input. In one embodiment, this user input is generated when the user manipulates the respective component that is included in the browser or other application as can be appreciated. According to one embodiment, the merchant may restrict the manual check as to whether a given item 136 appears on a respective network page 145 to the top selling items 136 through the electronic commerce system 123. For example, the top hundred, thousand, or other number of items 136 may be manually scrutinized on a periodic basis to ensure that they appear in the respective network pages 145 as described above.

Figure 4:
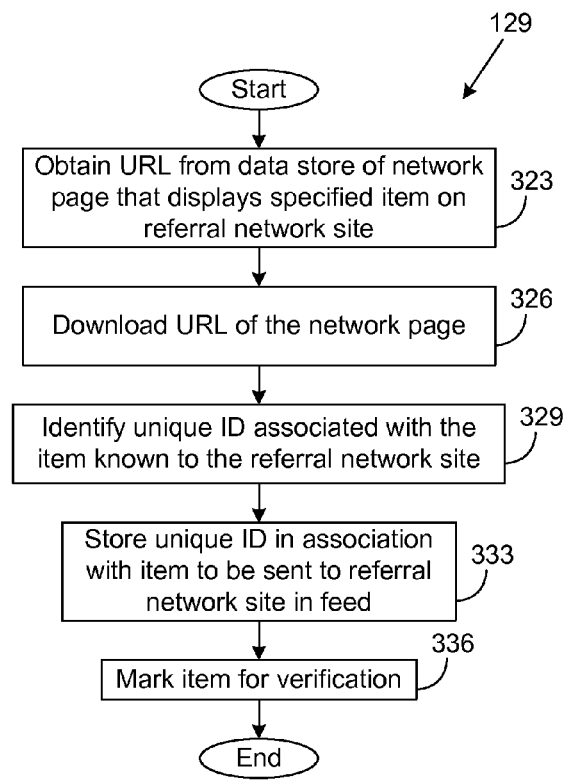
FIG. 4 is a drawing of a flowchart that illustrates additional functionality of the crawler application implemented in one of the servers in the networked environment of FIG. 1 according to an embodiment of the present disclosure.

With reference then to FIG. 4, shown is another portion of the crawler application 129 according to various embodiments. Alternatively, the flowchart of FIG. 4 may be viewed as depicting further steps of a method implemented in the server 103 (FIG. 1) according to various embodiments. The flowchart of FIG. 4 depicts the functionality of the crawler application 129 in attempting to identify information about an item 136 (FIG. 1) for which a respective merchant offering 203 (FIG. 2) for the merchant operating the electronic commerce system 123 (FIG. 1) fails to appear in a corresponding network page 145 (FIG. 1) in spite of the fact that such an item 136 is included in the feed 139 (FIG. 1) to the referral network site 143 (FIG. 1).

To begin, in box 323, the crawler application 129 obtains the network address from the data store 116 (FIG. 1) that is associated with the network page 145 that displays the various merchant offerings 203 for the specified item 136 with respect to the referring network site 143. Such network address was previously stored in box 306 (FIG. 3) mentioned above. Thereafter, in box 326, the crawler application 129 downloads an instance of the network page 145 using the respective network address. In one embodiment, the crawler application 129 may initiate an instance of at least a portion of a browser application to download the desired network page 145, or crawler application 129 may be configured to include the functionality needed to download the network page 145.

Then, in box 329, the crawler application 129 attempts to identify a unique identifier associated with the item 136 that is known to the referring network site 143. Such a unique identifier is identified within the network page 145 that was downloaded in box 326. The unique identifier may comprise, for example, a stock-keeping unit (SKU), Universal Product Code (UPC), or other such number that is known to the referring network site 143. The unique identifier may be a public identifier or it may be proprietary to the referral network site 143.

In order to identify the unique identifier associated with the item 136 from the network page 145, the crawler application 129 may identify the unique identifier in the network address associated with the network page 145. However, in some cases, the unique identifier will not be included in the network address associated with the network page 145.

In such case, the crawler application 129 may further identify such a unique identifier in the source code of the network page 145. To obtain guidance in finding the unique identifier in the source code of the network page 145, the crawler application 129 may store the location of such unique identifiers for other items 136 obtained from source code from other network pages 145 for the referral network site 143. To this end, it may be presumed that the source code of the various network pages 145 generated by a given referral network site 143 for different items 136 are structured in a similar manner. To this end, a template of such network pages 145 may be stored in the data store 116 to aid in attempting to find unique identifiers for an item 136 in a referral network site 143.

Further, in identifying a uniform identifier associated with a given item 136 from the network page 145, the crawler application 129 may identify a string of characters associated with that network page 145 that conforms to a predefined format identified for the respective referral network site 143. To this end, the predefined format of identifiers used by such referral network site 143 may be predetermined, or it may be detected in one or more network sites 145 and used thereafter to aid in detecting unique identifiers for other items 136. Further, the crawler application 129 may also examine attributes associated with a given network page 145 that lists such unique identifiers as can be appreciated.

Once a unique identifier associated with a given item 136 is identified in box 329, then in box 333 such unique identifiers are stored in the data store 116 in the item verification table 166 in association with the respective item 136. When the item feed application 126 generates the feed 139 to send to the referral network site 143, the item feed application 126 may be configured to include not only the item 136, but the unique identifier obtained from the network page 145 in the feed 139 associated with the item 136. To this end, the feed 139 includes the listing of the respective item 136, where the item 136 is offered for sale by the merchant.

Thereafter, in box 336, the item 136 is marked for verification in the item verification table 166 (FIG. 1). The approach taken to verify an item 136 will be described with respect to later figures. Thereafter, this portion of the crawler application 129 ends as shown.

Figure 5:
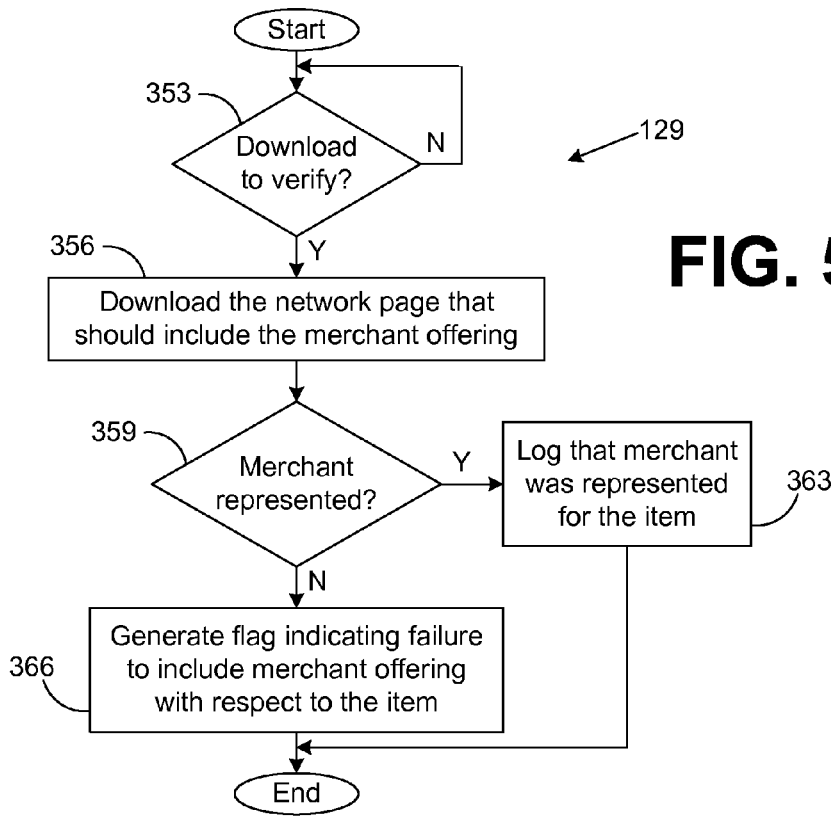
FIG. 5 is a drawing of a flowchart that illustrates further functionality of the crawler application implemented in one of the servers in the networked environment of FIG. 1 according to an embodiment of the present disclosure.

Next, with reference to FIG. 5, shown is a flowchart that illustrates a further portion of the crawler application 129 according to various embodiments. Alternatively, the flowchart of FIG. 5 may be viewed as depicting steps of a method implemented in the server 103 (FIG. 1) according to various embodiments. The flowchart of FIG. 5 depicts functionality of the crawler application 129 in verifying that a merchant offering 203 (FIG. 2) of a respective item 136 (FIG. 1) is appearing in a given network page 145 (FIG. 1) after a unique identifier known to the referral network site 143 (FIG. 1) is included in the feed 139 (FIG. 1) in association with the item 136 as described above.

To begin, in box 353, the crawler application 129 determines whether it is to download a given network page 145 based on the network address stored in the item verification table 166 (FIG. 1) to verify that the merchant offering 203 for the respective item 136 by the merchant properly appears in such network page 145. Note that this may first be done after a predefined period of time after the unique identifier associated with the referral network site 143 has been included in the feed 139, presumably providing the referral network site 143 with enough time to react to the new information included in the feed 139 to make sure that the merchant offering 203 for such item 136 properly appears in a respective network page 145.

Also, such verification may be performed periodically after an initial verification is done in which it was confirmed that the merchant offering 203 of the item 136 did, in fact, appear in the network page 145. Specifically, once an initial verification is performed after a unique identifier is included in the feed 139 and it is verified that the merchant offering 203 for the item 136 appears in the respective network page 145, then later verifications may be performed periodically to ensure that the merchant offering 203 for the respective item 136 by the merchant continues to appear in the network page 145 and is not dropped for some reason. To this end, the functionality of FIG. 5 may be implemented in each instance to verify the existence of the merchant offering 203 for a given item 136.

Assuming that a verification is to be performed as determined in box 353, then in box 356, the crawler application 129 accesses or downloads the network page 145 that should include such merchant offering 203 for a respective item 136. Thereafter, in box 359, it is determined whether the offering of the merchant is represented among those merchant offerings 203 listed in the network page 145. Assuming that the desired merchant offering 203 is listed, then the crawler application 129 proceeds to box 363 to log that the merchant was properly represented in the network page 145 for the respective item 136. Such log may be entered in the item verification table 166 for future reference. Thereafter, the crawler application 129 ends as shown.

However, if the merchant is not represented in box 359, then the crawler application 129 proceeds to box 366 to flag the item 136 in the item verification table 166 indicating a failure to include the merchant offering 203 for the item 136 in the respective network page 145. Thereafter, further action may be taken with respect to such item 136 to ensure that it is properly included in subsequent network pages 145. Thus, the repeated verification that a merchant offering 203 for an item 136 continues to appear in a respective network page 145 generated by the referral network site 143 ensures that merchant offerings 203 for respective items 136 are not dropped due to changes that might occur in the operation of the referral network site 143, etc.

Figure 6:
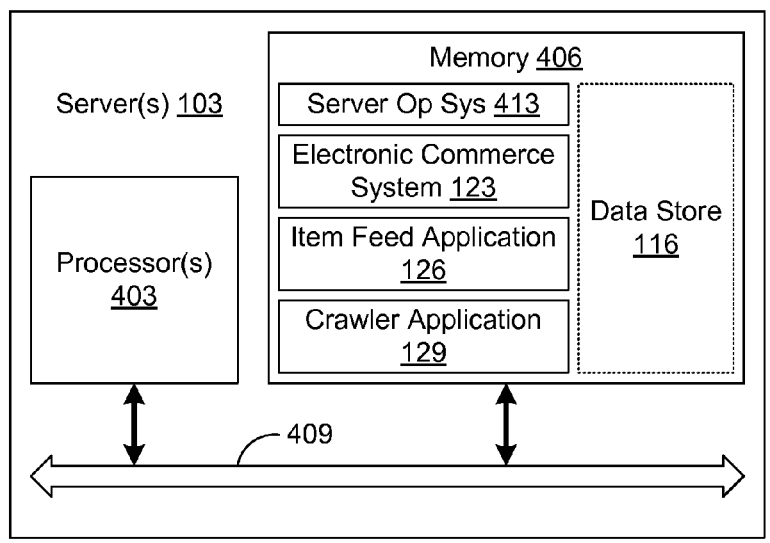
FIG. 6 is a schematic block diagram of one example of one of the servers in the networked environment of FIG. 1 according to an embodiment of the present disclosure.

Referring next to FIG. 6, shown is a schematic block diagram of one example of a server 103 according to an embodiment of the present disclosure. The server 103 includes at least one processor circuit, for example, having a processor 403 and a memory 406, both of which are coupled to a local interface 409. The processor 403 is a solid state device that includes millions of switching elements such as transistors and other elements. The server 103 may comprise, for example, a server computer system or like device as described above. The local interface 409 may comprise, for example, a data bus with an accompanying address/control bus or other bus structure as can be appreciated.

Stored in the memory 406 are both executable applications and/or systems executed by the processor 403 and data. In particular, stored in the memory 406 and executable by the processor 403 are a server operating system 413, the electronic commerce system 123, the item feed application 126, the crawler application 129, and potentially other applications and/or systems, etc. Also, stored in the memory 406 is the data store 116 in which are stored the various data items described above so as to be accessible to the processor 403. It is understood that other data may be stored in the memory 406 and accessed by the processors 403 beyond the data described above.

A number of software components are stored in the memory 406 and are executable or executed by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 403 may represent multiple processors and the memory 406 may represent multiple memories that operate in parallel. In such a case, the local interface 409 may be an appropriate network that facilitates communication between any two of the multiple processors, between any processor and any one of the memories, or between any two of the memories etc. The local interface 409 may comprise additional systems designed to coordinate this communication, including, for example, performing load balancing. The processor 403 may be of electrical or of some other available construction.

The various systems, applications, or other components described above may be implemented using any one or more of a number of programming languages such as, for example, C, C++, C#, Visual Basic, VBScript, Java, JavaScript, Perl, Ruby, Python, Flash, or other programming languages.

Although the various applications and other components such as, for example, the electronic commerce system 123, the item feed application 126, and the crawler application 129 described above may be embodied in software or code executed by general purpose hardware, as an alternative each may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-5 show the functionality and operation of an implementation of the various applications and/or other components such as, for example, the crawler application 129 or other applications as described above. If embodied in software, each of the various blocks described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various applications, systems, and/or other components described herein such as, for example, the electronic commerce system 123, the item feed application 126, and the crawler application 129 comprise software or code, each can be embodied in any computer-readable medium for use by or in connection with an instruction execution system such as, for example, a processor in a computer system or other system. In this sense, the applications or engines may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, semiconductor, or other media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer readable medium embodying a program executable by a computer system, comprising:
   code that maintains a listing of items offered for sale through an electronic commerce system that comprises a network presence of an entity, wherein the electronic commerce system facilitates a sale of a plurality of items by the entity;
   code that automatically accesses a network page generated by a comparison shopping network site, the network page displaying a plurality of offerings for an item among the listing of items by a plurality of competitor entities, wherein an offering for the item by the entity is erroneously omitted from the network page;
   code that identifies a unique identifier associated with the item from the network page and stores the unique identifier in association with the item offered for sale through the electronic commerce system, the unique identifier being specified by a taxonomy used by the comparison shopping network site, the taxonomy used by the comparison shopping network site being different than a separate taxonomy used by the electronic commerce system;
   code that includes the unique identifier in association with the offering for the item into a feed generated for the comparison shopping network site, wherein the feed is sent from a computing device to the comparison shopping network site; and
   code that accesses the network page in response to sending the feed to the comparison shopping network site and verifies whether the offering for the item by the entity appears in the network page.

2. The non-transitory computer readable medium embodying the program executable by the computer system of claim 1, wherein a crawler application is further configured to periodically access the network page to further verify that the offering for the item by the entity has not been dropped from the network page after an appearance in the network page of the offering for the item by the entity is verified.

3. The non-transitory computer readable medium embodying the program executable by the computer system of claim 1, wherein the unique identifier associated with the item from the network page is identified as a portion of a network address associated with the network page.

4. The non-transitory computer readable medium embodying the program executable by the computer system of claim 1, wherein the unique identifier associated with the item from the network page is identified in a source code associated with the network page.

5. A method, comprising:
   maintaining a listing of items offered for sale through an electronic commerce system that comprises a network presence of an entity, wherein the electronic commerce system facilitates a sale of a plurality of items by the entity;
   automatically accessing, in at least one computing device, a network page generated by a referral network site that displays at least one offering of an item by at least one competitor entity, wherein an offering for the item by the entity is erroneously omitted from the network page;
   identifying, in the at least one computing device, a unique identifier associated with the item from the network page;
   storing the unique identifier in association with the item in a data store accessible to the at least one computing device, the unique identifier being specified by a taxonomy used by the referral network site, the taxonomy used by the referral network site being different than a separate taxonomy used by the electronic commerce system;
   including, in the at least one computing device, the item and the unique identifier in a feed and sending the feed to the referral network site in response to including the item and the unique identifier in the feed, the feed including a listing of the item and a plurality of other items, wherein the item and the plurality of other items are offered for sale by the entity; and
   accessing, in the at least one computing device, the network page in response to sending the feed to the referral network site to verify whether the offering for the item by the entity appears in the network page.

6. The method of claim 5, wherein the network page is automatically accessed using a crawler application.

7. The method of claim 5, wherein automatically accessing, in the at least one computing device, the network page generated by the referral network site further comprises:
   initiating an instance of at least a portion of a browser application in the at least one computing device; and
   employing the instance of the at least a portion of the browser application to access the network page.

8. The method of claim 5, further comprising automatically storing, in the at least one computing device, a network address of the network page accessed and rendered by a browser application in the data store in response to a user input.

9. The method of claim 5, wherein the unique identifier is proprietary to the referral network site.

10. The method of claim 5, further comprising periodically accessing, in the at least one computing device, the network page to verify that the offering for the item by the entity continues to appear in the network page once an appearance in the network page of the offering for the item by the entity is first verified.

11. The method of claim 5, wherein identifying, in the at least one computing device, the unique identifier associated with the item from the network page further comprises identifying the unique identifier in a network address associated with the network page.

12. The method of claim 5, wherein identifying, in the at least one computing device, the unique identifier associated with the item from the network page further comprises identifying the unique identifier in a source code of the network page.

13. The method of claim 5, wherein identifying, in the at least one computing device, the unique identifier associated with the item from the network page further comprises identifying a string of characters associated with the network page that conform to a predefined format.

14. The method of claim 5, wherein identifying, in the at least one computing device, the unique identifier associated with the item from the network page further comprises identifying an attribute associated with the network page that lists the unique identifier.

15. A system, comprising:
   at least one computing device;
   a listing of a plurality of items stored in a data store associated with the at least one computing device, the items being offered for sale through an electronic commerce system that comprises a network presence of an entity, the electronic commerce system facilitating sale of the items by the entity; and
   a crawler application executable in the at least one computing device, wherein the crawler application is configured to:

automatically access a network page generated by a comparison shopping network site, the network page displaying a plurality of offerings for one of the items by a plurality of competitor entities, wherein the network page fails to present an offering for the one of the items by the entity;

identify a unique identifier associated with the one of the items from the network page and stores the unique identifier in association with the one of the items offered for sale through the electronic commerce system, the unique identifier being specified by a taxonomy used by the comparison shopping network site, the taxonomy used by the comparison shopping network site being different than a separate taxonomy used by the electronic commerce system;

include the offering for the one of the items and the unique identifier in a feed of the items generated for the comparison shopping network site;

send the feed from the at least one computing device to the comparison shopping network site; and access the network page in response to sending the feed to the comparison shopping network site and verify whether the offering for the one of the items by the entity appears in the network page.

16. The system of claim 15, wherein the crawler application is further configured to store the unique identifier in association with the one of the items in a data store.

17. The system of claim 16, wherein a network address of the network page is stored in the data store in response to a user input after the network page is accessed and rendered by a browser application.

18. The system of claim 15, wherein the unique identifier is proprietary to the comparison shopping network site.

19. The system of claim 15, wherein the crawler application is further configured to periodically access the network page to verify that the offering for the one of the items by the entity has not been dropped from the network page once an appearance in the network page of the offering for the one of the items by the entity is first verified.

20. A non-transitory computer readable medium embodying a program executable by a computer system, comprising:

code that maintains an item offered for sale through an electronic commerce system that comprises a network presence of an entity, wherein the electronic commerce system facilitates a sale of the item by the entity and employs a first identification system that assigns a first identifier to the item;

code that automatically accesses a network page generated by a comparison shopping network site, the network page displaying a plurality of offerings for the item by a plurality of competitor entities, wherein an offering for the item by the entity is erroneously omitted from the network page;

code that accesses the network page to identify a second identifier associated with the item, the second identifier being specified by a taxonomy used by the comparison shopping network site, the taxonomy used by the comparison shopping network site being different than a separate taxonomy used by the electronic commerce system, wherein the comparison shopping network site employs a second identification system that assigns the second identifier to the item;

code that includes the second identifier in association with an offering for the item by the entity into a feed generated for the comparison shopping network site sent from a computing device to the comparison shopping network site; and code that accesses the network page in response to sending the feed to the comparison shopping network site and verifies whether the offering for the item by the entity appears in the network page.

21. The non-transitory computer readable medium embodying the program executable by the computer system of claim 20, wherein the code that accesses the network page to identify the second identifier associated with the item further comprises code that parses a network address associated with the network page.

22. The non-transitory computer readable medium embodying the program executable by the computer system of claim 20, wherein the second identifier is selected from a group consisting of a stock-keeping unit number and a universal product code.

23. The non-transitory computer readable medium embodying the program executable by the computer system of claim 20, further comprising code that determines whether at least one of a plurality of items offered for sale through the electronic commerce system should be included in the feed.

24. The non-transitory computer readable medium embodying the program executable by the computer system of claim 23, further comprising code that determines whether to reintroduce the at least one of the plurality of items into the feed if the at least one of the plurality of items was previously excluded from the feed.

25. The non-transitory computer readable medium embodying the program executable by the computer system of claim 20, further comprising code that maintains an item verification table for tracking whether a plurality of items offered for sale through an electronic commerce system appear on respective network pages generated by the comparison shopping network site.

26. The system of claim 15, wherein identifying the unique identifier associated with the item from the network page further comprises identifying the unique identifier in a network address associated with the network page.

27. The system of claim 15, wherein identifying the unique identifier associated with the item from the network page further comprises identifying the unique identifier in a source code of the network page.

* * * * *